(12) United States Patent
Van Snellenberg

(10) Patent No.: US 9,432,821 B2
(45) Date of Patent: Aug. 30, 2016

(54) ADAPTIVE NOTIFICATION SYSTEM FOR MOBILE DEVICES

(71) Applicant: Michael Van Snellenberg, Seattle, WA (US)

(72) Inventor: Michael Van Snellenberg, Seattle, WA (US)

(73) Assignee: Wellpepper, Inc., Seattle, WA (US)

(*) Notice: Subject to any disclaimer, the term of this patent is extended or adjusted under 35 U.S.C. 154(b) by 31 days.

(21) Appl. No.: 14/207,023

(22) Filed: Mar. 12, 2014

(65) Prior Publication Data
US 2014/0273978 A1 Sep. 18, 2014

Related U.S. Application Data

(60) Provisional application No. 61/802,474, filed on Mar. 16, 2013.

(51) Int. Cl.

| | |
|---|---|
| H04M 1/725 | (2006.01) |
| H04W 4/14 | (2009.01) |
| H04W 4/16 | (2009.01) |
| H04W 4/02 | (2009.01) |
| H04W 4/00 | (2009.01) |
| H04W 4/04 | (2009.01) |
| H04W 4/18 | (2009.01) |
| H04W 4/12 | (2009.01) |
| H04W 4/20 | (2009.01) |
| H04W 40/00 | (2009.01) |
| H04L 12/58 | (2006.01) |
| G06Q 30/02 | (2012.01) |

(52) U.S. Cl.
CPC ................. *H04W 4/14* (2013.01); *H04W 4/00* (2013.01); *H04W 4/02* (2013.01); *H04W 4/04* (2013.01); *H04W 4/12* (2013.01); *H04W 4/16* (2013.01); *H04W 4/18* (2013.01); *H04W 4/20* (2013.01); *G06Q 30/0239* (2013.01); *H04L 12/587* (2013.01); *H04W 40/00* (2013.01)

(58) Field of Classification Search
CPC . G06Q 10/107; G06Q 10/1093; G06Q 40/00; G06Q 30/0252; G06Q 30/0641; G06Q 30/0239; G06Q 10/06314; H04M 1/72566; H04M 2203/2072; H04M 10/109; H04M 3/42; H04W 4/16; H04W 4/02; H04W 4/00; H04W 40/00; H04W 4/04; H04W 4/18; H04W 4/12; H04W 4/14; H04W 4/20; H04L 12/587; H04L 51/08
USPC ............. 455/414.1, 405, 456.3, 556.2, 412.1, 455/412.2, 418; 709/206, 201, 218; 379/47
See application file for complete search history.

(56) References Cited

U.S. PATENT DOCUMENTS

| | | | |
|---|---|---|---|
| 8,560,632 B2 | 10/2013 | Kamga | |
| 2001/0051887 A1* | 12/2001 | Jeyachandran | .. G06Q 10/06311 705/7.21 |

(Continued)

FOREIGN PATENT DOCUMENTS

WO   2012/141945 A1   10/2012

*Primary Examiner* — Fred Casca

(74) *Attorney, Agent, or Firm* — Christensen O'Connor Johnson Kindness PLLC

(57) ABSTRACT

Adaptive message notification for mobile devices is disclosed. Notification messages, each with an attached or embedded Trace ID, are sent by a message service to one or more mobile devices. The message content and timing is controlled by a modifiable ruleset maintained by the message service. User action in response to a notification message results in session data and an embedded or attached Trace ID being sent by the mobile device(s) to the message service. The message service analyzes the session data and, if appropriate, modifies the ruleset.

17 Claims, 10 Drawing Sheets

(56) References Cited

U.S. PATENT DOCUMENTS

2008/0013705 A1* 1/2008 Yoffie .................. G06Q 10/109
                                                          379/201.12
2011/0153663 A1* 6/2011 Koren ............... G06F 17/30964
                                                          707/776
2011/0319115 A1* 12/2011 Racz ..................... H04W 24/10
                                                          455/514

* cited by examiner

ADAPTIVE NOTIFICATION SYSTEM FOR MOBILE DEVICES

CROSS-REFERENCE TO RELATED APPLICATION

This application claims the benefit of Provisional Application No. 61/802,474, filed Mar. 16, 2013, and is incorporated herein by reference in its entirety.

BACKGROUND

Mobile software applications frequently need to notify users of data changes or remind them of scheduled events. Often, these notification messages prompt a user to engage and take action. It would be valuable to mobile software applications to know the best time, content, and users to whom to send notifications; however, existing notification systems do not capture and measure subsequent user interaction, or lack thereof, and use it as a feedback response to a notification message.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An adaptive notification system for mobile devices that provides a way of measuring the effectiveness of mobile notification messages as users interact and engage with them on their devices (for example, cellular phones and tablets) is disclosed. For example, in a health/wellness environment, it is often important to notify users when it is time for them to complete a task (an exercise, wound care, or taking a dose of medicine perhaps). In order to improve the way in which users are notified (the time when the notification is sent, the specific verbiage of the notification, etc.), the disclosed adaptive notification system provides a way to understand how effective a given notification is at engaging the user and ultimately moving the user to take action.

User engagement can be measured by a variety of means, depending on the capabilities of a mobile device. User engagement measurement is used in the disclosed adaptive notification system to create a closed-loop feedback mechanism that can, using simple heuristics or more advanced machine learning techniques, automatically adapt, i.e., change, the delivery parameters of notifications (including user & device selection, frequency, time of day, user's device location, days of week, textual or media content) in order to obtain the highest level of user engagement. More specifically, after observing, i.e., measuring, a user's engagement, the disclosed adaptive notification system begins to optimize how the user is notified. For example, in a health/wellness environment, the disclosed adaptive notification system might measure whether a user interacts with a notification indicating that it is time to complete a task such as a particular exercise. If previous notifications sent in the evenings when the user is at home produced higher engagement than those sent at midday when the user is at work, the system can adapt future notifications to send more notifications in the evening when the user is at home and more likely to engage, i.e., perform the exercise, and fewer notifications at midday when the user is at work and less likely to engage.

The feedback loop resulting from observing a user's engagement increases the perceived user relevance of notifications, and increases the engagement yield of the message sender. Feedback loops are built both for the individual user receiving a notification—personalized adaptive messaging—and aggregated cohorts of users. For example, in a health/wellness environment, a cohort of users who are recovering from a joint replacement might show better engagement with frequent notifications that have an encouraging tone, whereas a cohort of competitive athletes undergoing rehabilitation for injuries may benefit from notifications with a more challenging and competitive tone, delivered less frequently.

Measuring the engagement and learning the optimal delivery parameters for individual users and cohorts of users is a central focus of the disclosed adaptive notification system.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
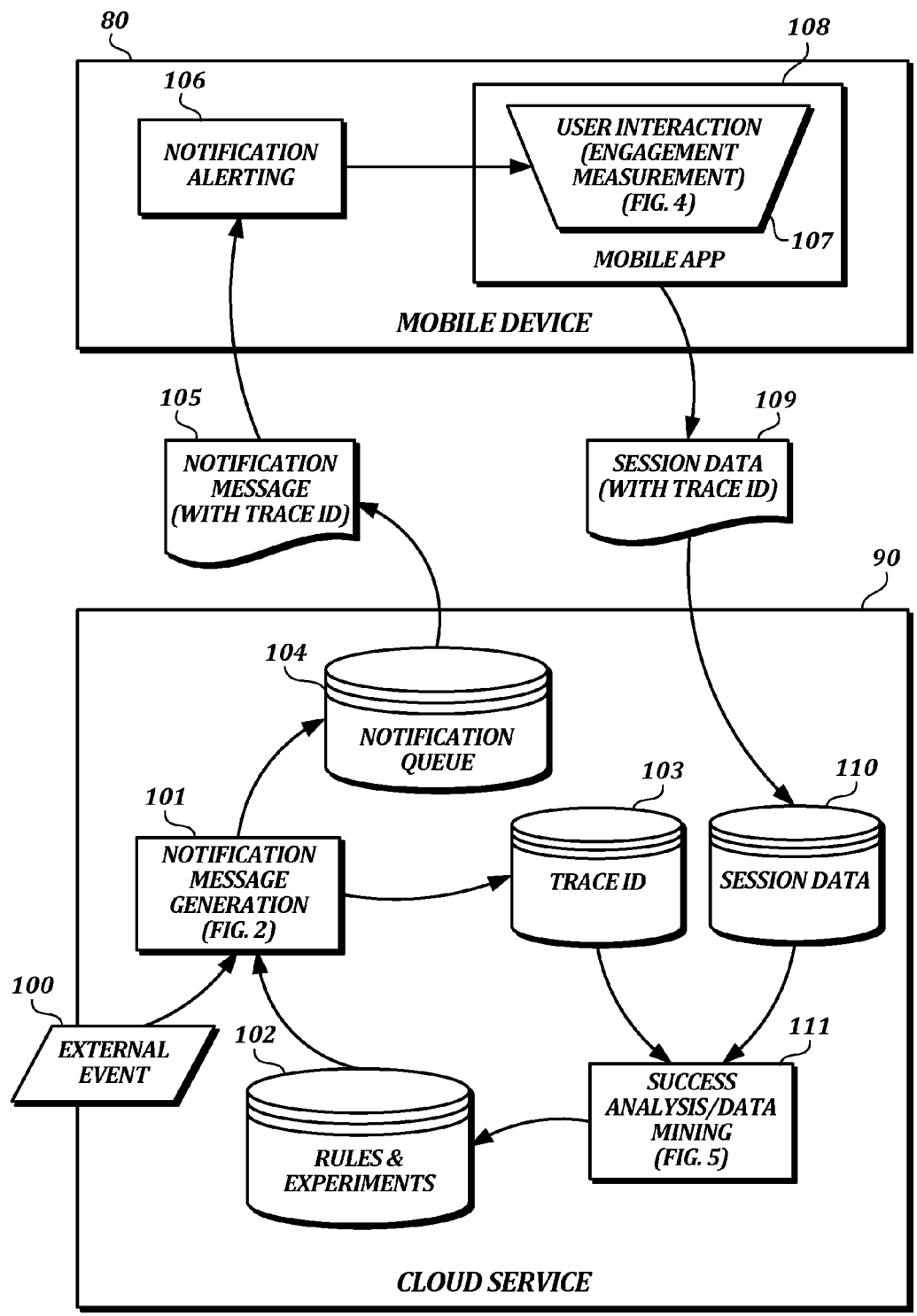
FIG. 1 illustrates an exemplary embodiment of an adaptive notification system that includes a Mobile Device and a Cloud Service.

As shown in the FIG. 1 exemplary embodiment, the components of an adaptive notification system for mobile devices can be broadly divided into components that run on a Mobile Device 80 and those that run on a service computing system, such as a Cloud Service 90. While the Cloud Service 90 will typically run on a distributed system of servers (often inside of Virtual Machines), in some embodiments, the Cloud Service 90 may run on a single server. In other embodiments, physical server(s) will be used instead of Virtual Machines.

The Mobile Device 80 can be any computing device capable of receiving real-time or near-real-time notification messages through some connected network, such as the Internet or a cellular network, either via apps installed on the device, or through a simple text messaging system like SMS (Short Message Service). In many actual embodiments, the Mobile Device will be the user's cellular phone, smartphone, Personal Digital Assistant (PDA), or tablet. While, for ease of description purposes, FIG. 1 illustrates a single Mobile Device 80 and Cloud Service components for serving the single Mobile Device, actual embodiments will normally involve multiple Mobile Devices and Cloud Service components suitable for serving the multiple Mobile Devices.

The process begins with some external event 100 indicating that there is an actionable message to deliver to one or more users. This may be a scheduled notification, a reminder, a state change in a database, or any other kind of interesting, i.e., relevant, event. For example, in a health/wellness scenario, this might be a reminder for a user to do some task (e.g., perform an exercise, care for a wound, or take medication). It could also be a state change like a healthcare provider updating an assigned treatment plan or responding to a question posed by the user. The event includes structured data about the message to be sent (for example, the particulars of a data state change) and the recipient users (for example, their user IDs, device IDs, and/or other data that allows users to be identified). The structured external event data is fed to a Notification Message Generation service 101.

The Notification Message Generation service uses a set of stored rules 102 to process the structured external event data and generate Notification Messages 101. Each Notification Message is tagged with a unique Trace ID, which is logged (i.e., stored) 103 for later analysis.

Figure 2:
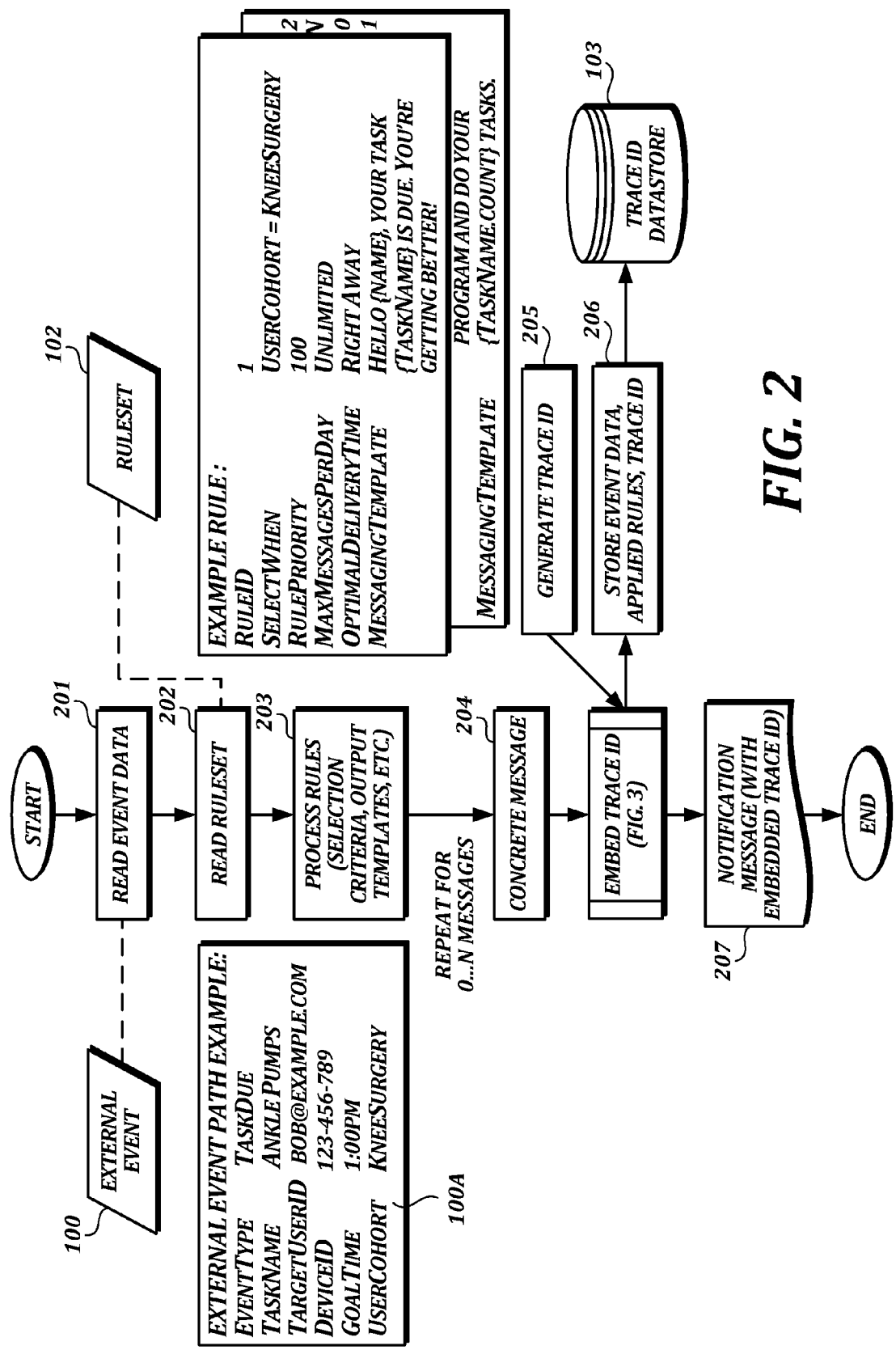
FIG. 2 is a flow diagram of an exemplary Notification Message Generation service suitable for use in FIG. 1.

A flow diagram of an exemplary Notification Message Generation service is illustrated in FIG. 2 and described next.

The Notification Message Generation service reads 201 the structured external event data 100, and a set of stored rules (a ruleset) 202 from a database or other durable storage system 102. An example 100A of structured external event data is shown in FIG. 2. In some embodiments, the ruleset may be partitioned into different experiment groups that allow comparisons to determine the effectiveness of different rulesets. For example, a control group might include a known-good set of rules, and an experimental set of rules might contain rules that are hypothesized—but not proven—to increase user engagement (for example, by batching message delivery and delaying until the user is at home). Experimental group rulesets would typically only be applied to a small subset of messages in order to minimize the risk of user dissatisfaction with unproven or poorly-performing rules, while still providing a large enough sample size to be statistically significant.

The ruleset governs how, when, and if a Notification Message will be delivered, based on the structured external event data 100. As with most business rules system, each rule will contain selection criteria (or "conditions") and actions. In this case, the rule's selection criteria specify which events the rule applies to by matching to one or more datapoints in the structured external event data. For example, a rule might match a particular individual user by name or id, or it might match a cohort of users, or it might match the time/date of the event. The types and number of selection criteria will depend on the schema of the structured event data. Different embodiments may implement different kinds matching rules including simple value equality (e.g., match when userid="bob@example.com"), set membership tests (e.g., match when event type in the set of ["task due", "task overdue"]), regular expression text matching, numerical comparisons such as greater-than, less-than (e.g., user birth year >=1978), time-series matching (e.g., notification time between 9:00 AM and 9:00 PM, device time zone), and spatial and geo-fence matching (e.g., does a location associated with an event fall within some geographic boundary). Obviously, this list should be taken as exemplary and not limiting.

Processing of the rules determines how, when, and if to generate and deliver Notification Messages. That is, the rules are processed using the selection criteria to find the applicable rules, and the applicable rules are applied 203. This action results in zero or one or more concrete messages 204 to be generated for delivery to specific user Mobile Devices and users. In most embodiments, the applicable set of rules may include one or more human-created rules (for example, mapping a set of input data to valid message text). In some embodiments, the ruleset may contain machine-learned decision trees (for example, that indicate a probability of the user interacting with this message based on the user's history of interacting with messages of this type).

After processing all of the rules in the retrieved ruleset, each resulting concrete message 204 is assigned a new, unique Trace ID 205. Unique Trace IDs may be sequential IDs or, in a distributed system, may be a unique identifier like a universally unique identifier (UUID). The assigned Trace ID is carried with, i.e., embedded in, the associated Notification Message as metadata. The assigned Trace ID is also logged into, i.e., stored in, 206 a Trace ID database 103 to facilitate later closed-loop data analysis.

Figure 3:
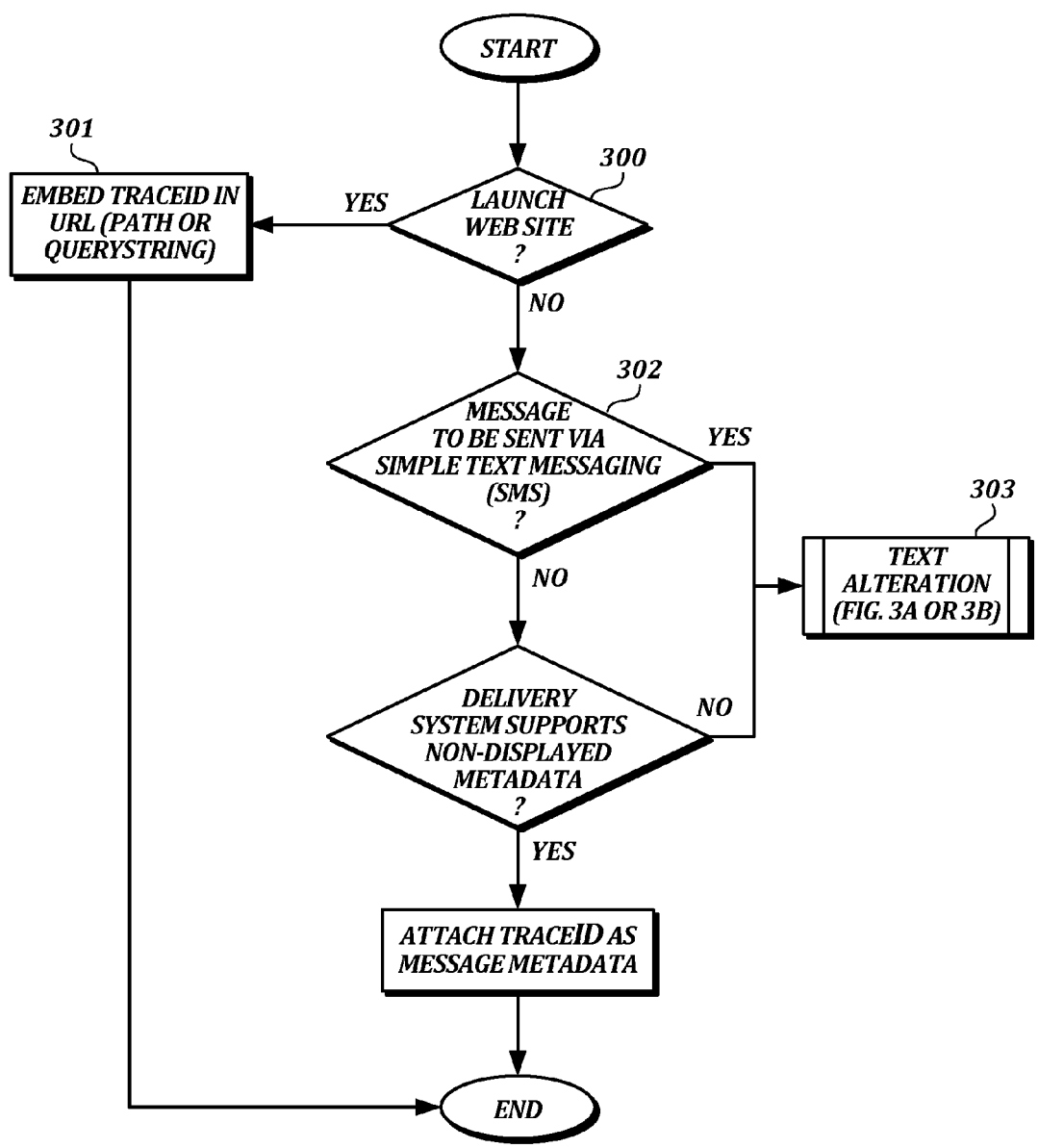
FIG. 3 is a flow diagram of an exemplary Embedded Trace ID subprocess suitable for use in the Notification Message Generation service shown in FIG. 2 that allows a Trace ID to be embedded in a message.

FIG. 3 is a flow diagram of an exemplary process for embedding a Trace ID in a Notification Message. Initially, a test 300 is made to determine if the desired user action is to launch a Web site. If so, the TraceID is embedded within the Web site URL 301; for example, the Trace ID might be included in the URL path, or added as a query-string parameter.

Figure 3A:
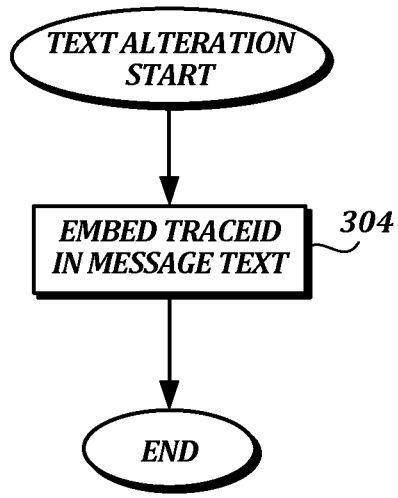
FIG. 3A is a flow diagram of an exemplary Text Alteration subprocess suitable for use in the Embedded Trace ID subprocess shown in FIG. 3.
Figure 3B:
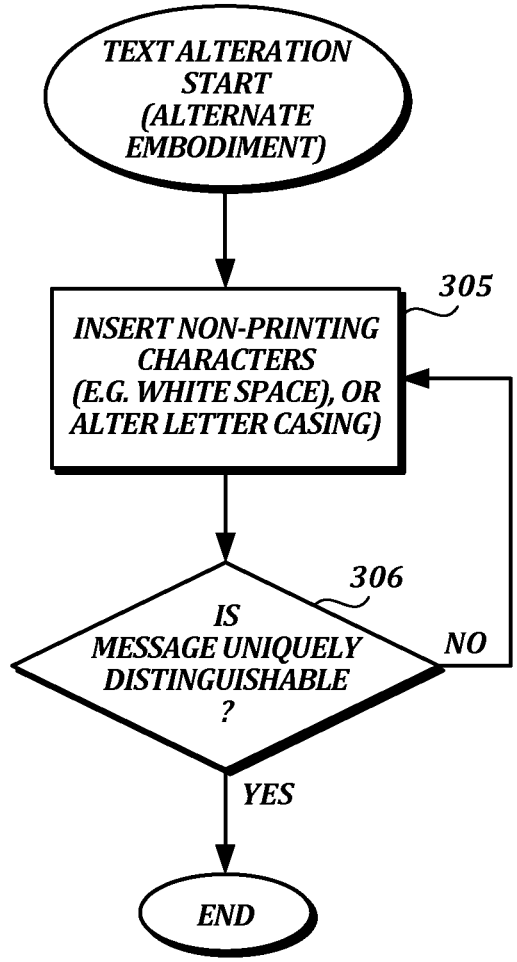
FIG. 3B is a flow diagram of an alternate exemplary Text Alteration subprocess suitable for use in the Embedded Trace ID subprocess shown in FIG. 3.

In some embodiments, such as a simple text messaging service, the structure of the Notification Message may not allow for a unique Trace ID to accompany the message as it travels through subsequent steps in the system. As a result, the next step in the FIG. 3 exemplary process is a test 302 to determine if the message can be sent via simple text messaging, i.e., via SMS. If so, the message text is suitably altered 303. Subprocess examples of text alteration are shown in FIGS. 3A and 3B. In FIG. 3A, the Trace ID is embedded 304 within the human-readable Notification Message itself 303. Alternatively, as shown in FIG. 3B, the content of the message may be subtlety altered so as to make the Notification Message content unique across all delivered messages. This may be accomplished by inserting non-printing characters and whitespace, altering letter casing, or substituting equivalent words 305 in a message distinguishing manner that is unique to each message 306. In such a case, a fingerprint hash of the altered Notification Message (for example, an MD5 hash or other suitable hash commonly used in the art) may be used as the Trace ID.

Returning to FIG. 1, after the Notification Message and its attached Trace ID are created (FIG. 2, 207), the combination is loaded into a Notification Queue 104. The combination is held pending the appropriate delivery conditions, for example, server time, device time, or device location, at which point the Notification Message and Trace ID combination are delivered to the Mobile Device 80 via a mobile platform notification system 105 compatible with the maker of the Mobile Device 80. This results in the Notification Message being delivered to the appropriate Mobile Device 80.

Figure 1A:
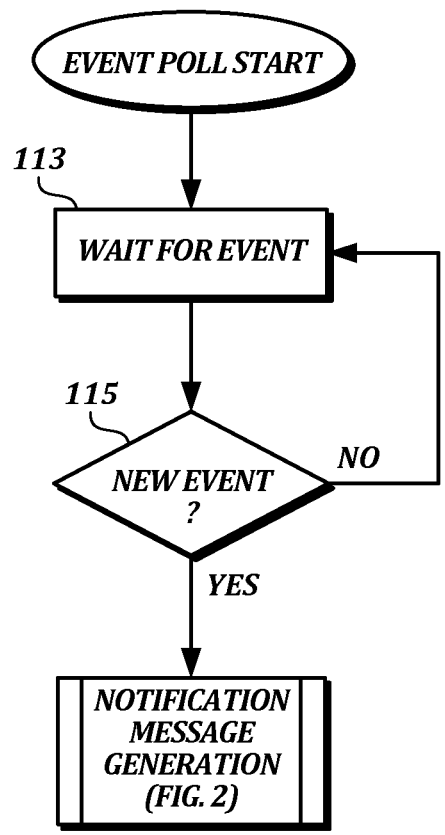
FIG. 1A is a flow diagram of an exemplary Event Poller that may be desirable in some embodiments.

It may be desirable in some embodiments to include an Event Poller in the Cloud Service 90 shown in FIG. 1 as an alternative to the External Event 100 initiation of Notification Messages. More specifically, there are at least two ways for the Cloud Service 90 to learn of the occurrence of an external event. The event can be "pushed" into the Cloud Service 90 as shown in FIG. 1, or the Cloud Service can make repeated checks, i.e., polls, for new external events at predetermined intervals. A flow diagram of an exemplary, alternative Event Poller is shown in FIG. 1A. As shown in FIG. 1A, initially a wait for an event step 113, i.e., a polling period step, occurs. After the polling period times out, a test 115 is made to determine if a new event has occurred; if not, the process cycles back to the wait step 208. If a new event has occurred, the remaining steps of FIG. 2 described above occur.

Figure 4:
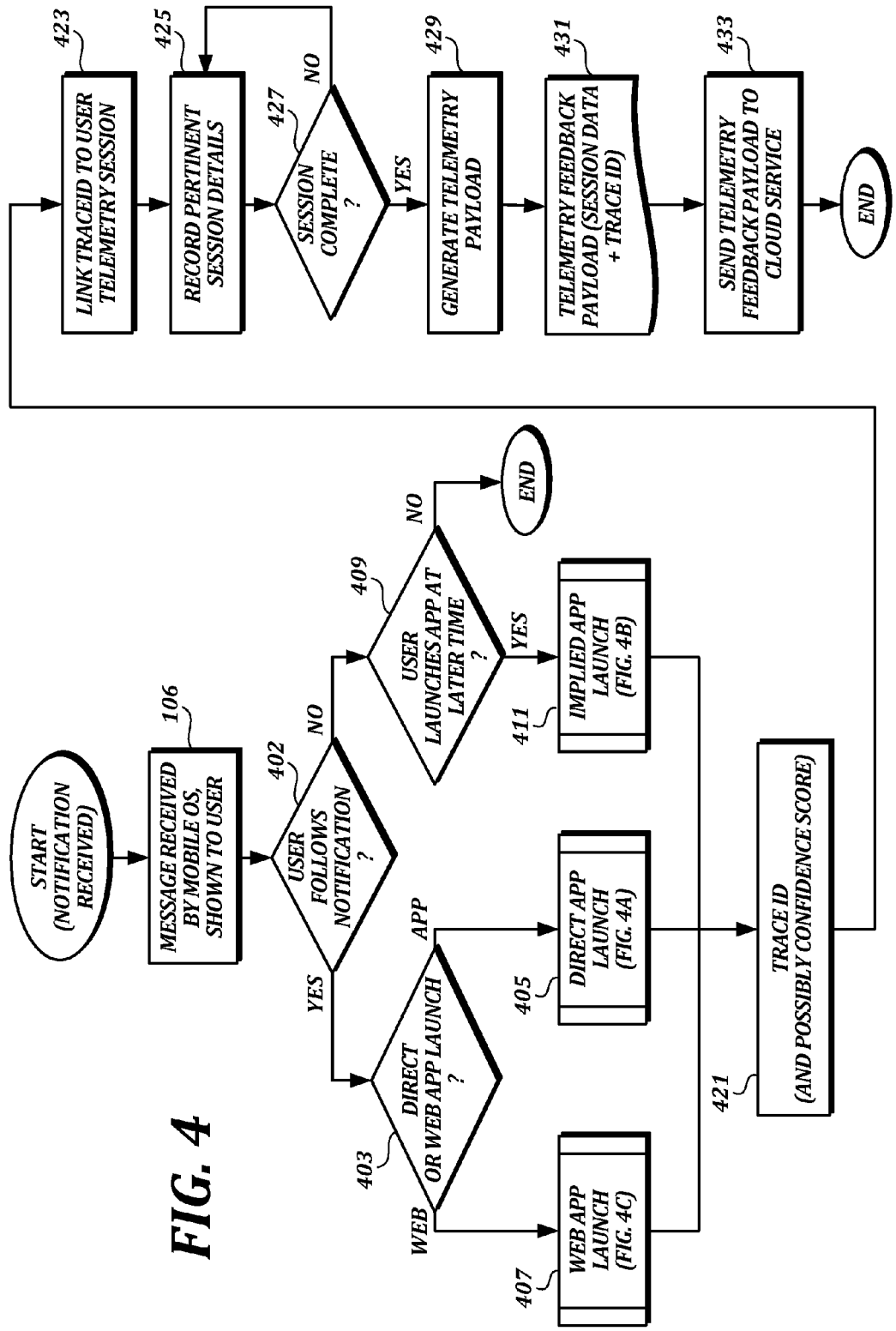
FIG. 4 is a flow diagram of an exemplary User Interaction (Engagement Measurement) application suitable for use by the Mobile Device shown in FIG. 1.
Figure 4A:
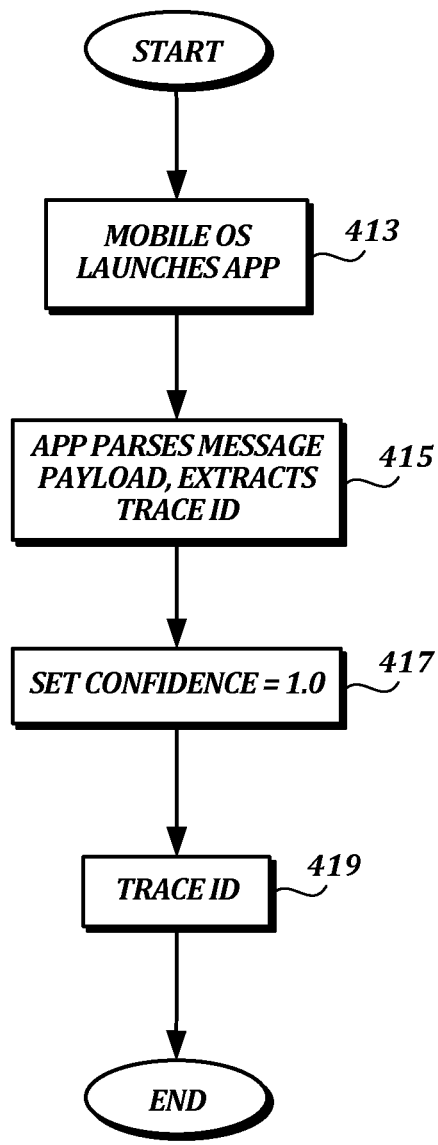
FIG. 4A is a flow diagram of an exemplary Direct Application Launch subprocess suitable for use in the User Interaction application shown in FIG. 4.
Figure 4B:
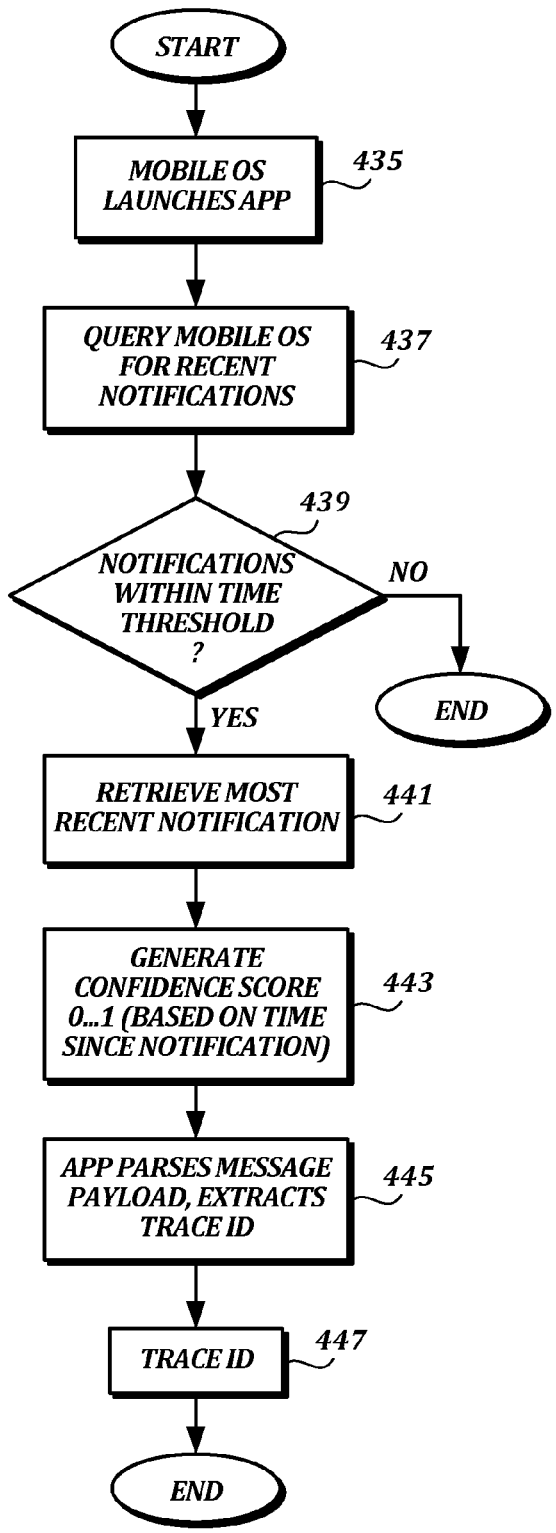
FIG. 4B is a flow diagram of an exemplary Implied Application Launch subprocess suitable for use in the User Interaction application shown in FIG. 4.
Figure 4C:
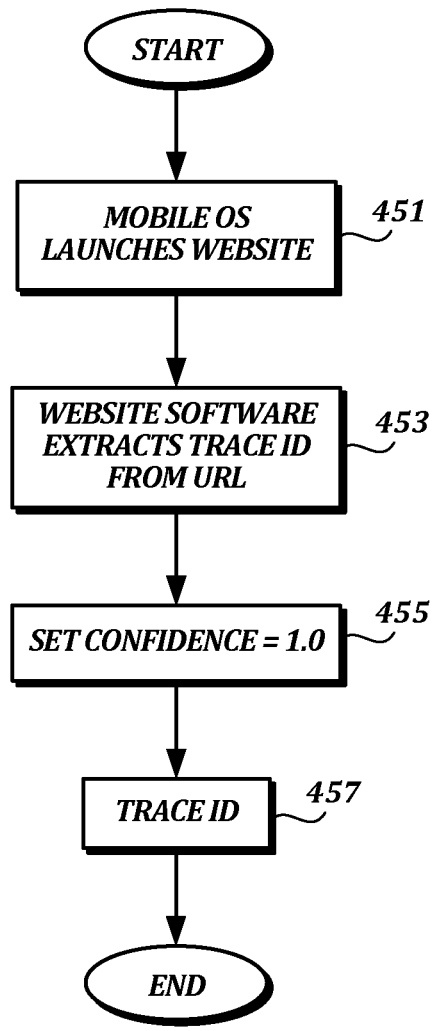
FIG. 4C is a flow diagram of an exemplary Web Application Launch subprocess suitable for use in the User Interaction application shown in FIG. 4.

FIG. 4 is a flow diagram of an exemplary User Interaction (Engagement Measurement) application suitable for use by a Mobile Device. FIGS. 4A, 4B, and 4C are flow diagrams of exemplary Direct Application Launch, Implied Application Launch, and Web Application Launch subprocesses suitable for use in FIG. 4. While all of these subprocesses are included in FIG. 4, one or more of them may not be included in actual embodiments of the disclosed subject matter.

Once a message has been delivered to the operating system of the Mobile Device 80 (mobile OS), the mobile OS alerts the user with a message pop-up or other type of alert notification 106 that is specific to the Mobile Device. In essence, the received message 106 is shown to the user. The message may take the form of a Simple Messaging System (SMS) text notification delivered by the mobile OS, or a mobile application notification, for example.

Preferably, the User Interaction, i.e., Engagement Measurement, with a given message 107 uses one or more device- and message-appropriate techniques to assign a confidence number indicating whether the user saw the message and took action. Numerous alternative methodologies can also be used. Three exemplary methodologies are described below Direct Application Launch (FIG. 4A), Implied Application Launch (FIG. 4B), and Web Application Launch (FIG. 4C).

After the Notification Message is received by the mobile OS and shown to the user 106, a feedback test 402 is made to determine if the user has followed or responded to the notification. If the user has followed the notification, a test 403 is made to determine if a Direct Application launch 405 or a Web application launch 407 is appropriate based on the Mobile Application program 108. If the user does not follow the notification within a reasonable predetermined period of time, at a later point in time a test 409 is made to determine if the user chose an alternative way to launch the Mobile Application. In this instance, an Implied Application Launch 411, shown in FIG. 4B and described below, occurs.

Most embodiments will likely make use of mechanisms within the mobile OS that result in a Direct Application Launch. An exemplary Direct Launch Application is shown in FIG. 4A and described next. After the mobile OS launches the Direct Launch Application 413, the full payload of the message which includes the Trace ID is parsed to extract the Trace ID 415 (or message hash, if message uniqueness was used in place of generating a distinct Trace ID, as described above). Because the user has followed the requirements of the Notification Message, the confidence level or score is set to maximum, e.g., 1.0 as shown in block 417. Then the Trace ID 419 (and possibly the confidence score) 421 are linked or associated with a new or existing user telemetry session 423 within the Mobile Application. Pertinent session details are recorded 425. At the conclusion of the session 427, pertinent details about the session (for example, tasks performed, time spent) are packaged 429 with the Trace ID into a telemetry feedback payload 431 and sent back 433 to the Cloud Service 90 (FIG. 1). This action may be accomplished with a file upload, a binary data transfer, a Web API call, or other technique familiar to those skilled in the art of data transmission.

In many cases, it may not be possible to directly determine a user's actions in response to the receipt of a Notification Message, either because of limitations in the mobile OS, or because the user chooses an alternate way to launch the mobile application. In this case, as shown in FIG. 4B, after the mobile OS launches the Web Application 435, the Web Application queries the mobile OS for recent notifications 437. If there are no notifications within a predetermined time period 439, the Web Application ends. If there are one or more notifications within the predetermined time period, the most recent notification is retrieved 441. This notification is deemed to have been acted on. Next, a confidence score is assigned based on the elapsed time since the notification 443.

For example, a notification that is 90 minutes old is given a lower confidence score than a notification that is only 2 minutes old. One useful approach that can be used to calculate a confidence level or score is the exponential time-decay formula:

$$c = \frac{1}{e^{kt}}$$

where c is the confidence score in the interval;

t is the time, in seconds since the notification was sent to the user; and k is a decay constant indicating how quickly the confidence score is penalized as time elapses After the confidence score is determined, the Web Application parses the message payload and extracts the Trace ID 445. Then, as previously described and shown in FIG. 4, the Trace ID 447 and possibly the confidence score 421 are linked to the telemetry session 423 followed by the remaining steps of FIG. 4 described above.

As illustrated in FIG. 4C, for Notification messages that do not cause the Mobile Application 108 installed on the Mobile Device 80 to launch a Direct Application (FIG. 4A) or an Implied Application (FIG. 4B), but instead prompt the user to cause the Mobile OS to launch a Web Application using a website URL 451, the Web Application extracts 453 the TraceID embedded in the URL located within the Notification Message. Since this action is caused by the user, the confidence level or score 455 is set to maximum, i.e., 1.0. The extracted Trace ID 457 and possibly the confidence score 421 are attached to a user telemetry session 423 as illustrated in FIG. 4 and previously described. Then, as also previously described with respect to FIG. 4, the result is packaged into a telemetry feedback payload 429, 431 for transmission 433 back to the Cloud Service 90.

Irrespective of the methodology used to measure user engagement, as shown in FIG. 1, when feedback payloads, i.e., session data and Trace ID 109, are received by the Cloud Service 90, the session data is written to a data store 110 optimized for storing log data, where the data is held for later processing.

Figure 5:
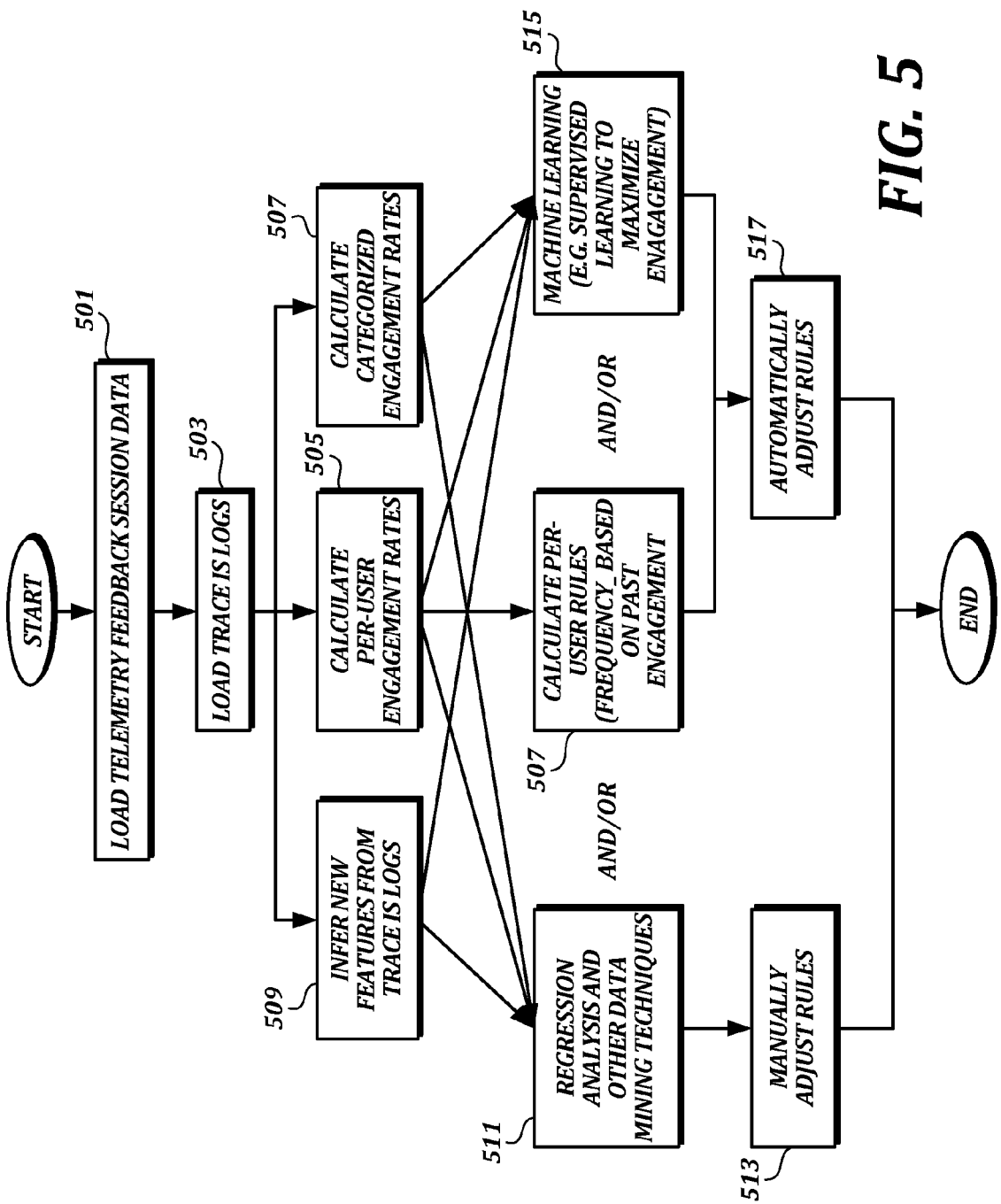
FIG. 5 is a flow diagram of an exemplary embodiment of a Success Analysis/Data Mining process suitable for use in FIG. 1.

At a convenient later point in time, a Success Analysis/Data Mining process 111 (FIG. 1) is started on the Cloud Service 90 to process the feedback log data stored in the data store 110. The inclusion of the same Trace ID in the Notification Message and in the session data provides feedback loop closure. A functional flow diagram of an exemplary Success Analysis/Data Mining process is shown in FIG. 5. In many actual embodiments, once a day would be the appropriate frequency to perform the Success Analysis/Data Mining process, although this action could occur more or less frequently depending on access to computing resources and the scale of the logged data. In an event as described below, the exemplary Success Analysis/Data Mining process employs a combination of heuristics, data mining, and machine learning techniques to update the active ruleset 102.

The Success Analysis/Data Mining process illustrated in FIG. 5 includes several analysis subprocesses, all of which may or may not be included in an actual embodiment. Initially, telemetry feedback session data and Trace ID logs are loaded 501, 503. Then, depending on implementation, past per-user engagement rates 505 may be calculated. The calculated rates are used to update rules to modulate future message delivery such that users who engage below a certain threshold receive fewer future messages than those who engage above a threshold 507. Again, depending on implementation, messages may be categorized according to their structured data originally obtained from the external event 100, and engagement rates for categorized messages can be calculated 507 and the result used to control the delivery rate of future messages by category. For example, in a health/wellness environment, one category of events might generate messages indicating that a healthcare provider has sent a personal message to a patient, and a second category might send automated reminders to patients to follow some task in their care plan. In this example, the two categories would likely exhibit differences in how well they engage users.

Further, again depending on implementation, some embodiments may infer additional structure from the originally supplied event data. For example, new features may be inferred from Trace ID logs 509. In the case of textual messages, additional structural influence may include textual analysis to produce a set of features thought to be important factors in a message's effectiveness. For example, in the case of a Notification Message informing a person that they are scheduled to perform a set of prescribed physical therapy exercises, the message length, the message tone (use of positive words), and the inclusion of proper nouns like the user's name, may be predictors of the effectiveness of the Notification Message.

The combination of directly-obtained structured data from the external initiating event 505, 507 and inferred message features 509 is mined using common data mining techniques such as regression analysis 511 to allow a human to manually create more effective rules 513. Additionally, or alternatively, if sufficient data is available, the same data can be used as inputs to supervised or unsupervised machine learning systems 515 to automatically adjust the ruleset 517 in order to maximize user engagement.

As will be readily appreciated by those skilled in the art and others, there exist many other ways of tying a notification to a user session as well as other data analysis techniques that can be used to update the delivery ruleset. As a result, it should be understood that the methods described herein should be taken as illustrative, and not as limiting.

While illustrative embodiments have been illustrated and described, it will be appreciated that various changes can be made therein without departing from the spirit and scope of the invention.

The embodiments of the invention in which an exclusive property or privilege is claimed are defined as follows:

1. An adaptive notification system for mobile devices, the adaptive notification system comprising one or more computing devices programmed to:
   (a) determine whether, when, and to which mobile devices notification messages are to be delivered based on a modifiable ruleset maintained by the adaptive notification system;
   (b) send notification messages to at least one mobile device, wherein the content of the notification messages is selected using the modifiable ruleset maintained by the adaptive notification system;
   (c) add a Trace ID in each notification message that uniquely identifies the message;
   (d) in response to the receipt of session data from the at least one mobile device responding to a notification message, analyze the session data, wherein the session data includes the Trace ID and feedback information indicating whether and how a user of said mobile device interacted with the notification message; and
   (e) modify the ruleset based at least in part on whether and how the user of said mobile device interacted with the notification message,
   wherein the ruleset is based on a type of notification message to be sent, and
   wherein the ruleset includes at least one delivery parameter, the delivery parameter chosen from the group consisting of an identity of the user of the at least one mobile device, type of mobile device, a cohort of users sharing a property or behavior, frequency of notification, time of day, location of the mobile device, day of the week, and textual or media content of the notification message.

2. The system claimed in claim 1, wherein the one or more computing devices are further programmed to send a notification message in response to the receipt of an external event.

3. The system claimed in claim 1, wherein said at least one mobile device generates a notification alert in response to receiving a notification message.

4. The system claimed in claim 1, wherein the one or more computing devices are further programmed to store notification messages in a notification queue prior to the notification messages being sent to said at least one mobile device.

5. The system claimed in claim 1, wherein the modification of the ruleset is further based on time between notification delivery and user engagement.

6. A computer-implemented adaptive method of notifying at least one mobile device of the need for a user of the at least one mobile device to take action, the method comprising, by an adaptive notification system comprising one or more computing devices:
   (a) determining whether, when, and to which mobile devices notification messages are to be delivered based on a ruleset maintained by a service computing system of the adaptive notification system;
   (b) generating notification messages based on the ruleset maintained by the service computing system, each of the notification messages including a Trace ID that uniquely identifies the message;

(c) sending the generated notification messages to the at least one mobile device;

(d) alerting the user of the at least one mobile device when a notification message is received;

(e) in response to action by the user of the mobile device, sending session data to the service computing system, the session data including the Trace ID that uniquely identified the notification message and feedback information indicating whether and how the user of the at least one mobile device interacted with the notification message;

(f) analyzing the session data to determine whether and how the user of said mobile device interacted with the notification message; and (g) changing the ruleset based at least in part on whether and how the user of said mobile device interacted with the notification message, wherein the ruleset is based on a type of notification message to be sent, and wherein the ruleset includes at least one delivery parameter, the delivery parameter chosen from the group consisting of an identity of the user of the at least one mobile device, type of mobile device, a cohort of users sharing a property or behavior, frequency of notification, time of day, location of the mobile device, day of the week, and textual or media content of the notification message.

7. The computer-implemented method claimed in claim 6, wherein notification messages are generated by the service computing system in response to the occurrence of an external event.

8. The computer-implemented method recited in claim 6, wherein the service computing system includes a notification queue and wherein the method comprises storing notification messages in the message queue prior to sending the notification messages to the at least one mobile device.

9. The computer-implemented method recited in claim 6, wherein the service computing system maintains a plurality of rulesets.

10. The computer-implemented method claimed in claim 6, wherein the analysis includes assigning a confidence value to the session data.

11. The computer-implemented method claimed in claim 10, wherein the confidence value is based on information associated with the receipt of the session data.

12. Computer-readable media stored on one or more computing devices for adaptively providing notification messages to at least one mobile device, the computer-readable media including computer-executable instructions that, when executed, cause one or more computing devices to:

(a) determine whether, when, and to which mobile devices notification messages are to be delivered based on a ruleset maintained by a service computing system;

(b) send notification messages from the message server to the at least one mobile device, the messages being based on the ruleset maintained by the service computing system, each message including a Trace ID that uniquely identifies the message;

(c) upon receipt of a notification message by the at least one mobile device, alert a user of the mobile device to the receipt of the message;

(d) in response to actions taken by the user of the at least one mobile device, send session data to the service computing system, the session data including the Trace ID that uniquely identified the notification message and feedback information indicating whether and how the user of the at least one mobile device interacted with the notification message;

(e) analyze the session data to determine whether and how the user of said mobile device interacted with the notification message; and (f) change the ruleset based at least in part on whether and how the user of said mobile device interacted with the notification message, wherein the ruleset is based on a type of the notification message to be sent, and wherein the ruleset includes at least one delivery parameter, the delivery parameter chosen from the group consisting of an identity of the user of the at least one mobile device, type of mobile device, a cohort of users sharing a property or behavior, frequency of notification, time of day, location of the mobile device, day of the week, and textual or media content of the notification message.

13. Computer-readable media as claimed in claim 12, wherein notification messages are generated by the service computing system in response to the occurrence of an external event.

14. Computer-readable media as claimed in claim 12, wherein notification messages are stored by the service computing system in a notification queue and wherein said computer-executable instructions cause said notification messages to be sent based on some predetermined criteria.

15. Computer-readable media as claimed in claim 12, wherein the actions taken by the user are in response to the receipt of a notification message.

16. Computer-readable media as claimed in claim 12, wherein the service computing system maintains a plurality of rulesets.

17. Computer-readable media as claimed in claim 12, wherein the analysis includes assigning a confidence score to the session data.

* * * * *